United States Patent
Jung et al.

(10) Patent No.: US 9,628,824 B2
(45) Date of Patent: Apr. 18, 2017

(54) VIDEO DECODING APPARATUS AND METHOD FOR ENHANCING VIDEO QUALITY

(71) Applicant: Samsung Electronics Co. Ltd., Suwon-si, Gyeonggi-do (KR)

(72) Inventors: Bong-Soo Jung, Suwon-si (KR); Jang-Hee Ryu, Seoul (KR); Jung-Won Lee, Incheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 14/033,874

(22) Filed: Sep. 23, 2013

(65) Prior Publication Data

US 2014/0169484 A1 Jun. 19, 2014

(30) Foreign Application Priority Data

Sep. 25, 2012 (KR) .................. 10-2012-0106736

(51) Int. Cl.
| | |
|---|---|
| *H04N 19/00* | (2014.01) |
| *H04N 19/86* | (2014.01) |
| *H04N 19/172* | (2014.01) |
| *H04N 19/117* | (2014.01) |
| *H04N 19/154* | (2014.01) |

(52) U.S. Cl.
CPC .......... *H04N 19/86* (2014.11); *H04N 19/117* (2014.11); *H04N 19/154* (2014.11); *H04N 19/172* (2014.11)

(58) Field of Classification Search
CPC .. H04N 7/26888; H04N 7/26058; H04N 7/50; H04N 7/26244; H04N 7/26382
See application file for complete search history.

(56) References Cited

U.S. PATENT DOCUMENTS

| | | | | | |
|---|---|---|---|---|---|
| 6,151,074 | A | * | 11/2000 | Werner | ............... G06T 1/60 345/541 |
| 7,019,774 | B2 | * | 3/2006 | Kuno | ............... H04N 5/2253 348/219.1 |
| 7,369,161 | B2 | * | 5/2008 | Easwar | ............... G06T 9/007 348/222.1 |
| 2006/0095451 | A1 | * | 5/2006 | Dvorak | ............. H04N 1/00127 |
| 2006/0152526 | A1 | * | 7/2006 | Kim | ............... G09G 5/363 345/589 |

(Continued)

FOREIGN PATENT DOCUMENTS

KR 10-2006-0081497 A 7/2006

*Primary Examiner* — Frank Huang
(74) *Attorney, Agent, or Firm* — Jefferson IP Law, LLP (57) ABSTRACT

A video decoding apparatus and method for enhancing video quality of lower resolution than the resolution of a display of a terminal is provided. The video decoding apparatus includes a quality enhancer and a controller. The quality enhancer includes a resizer and quality enhancement filters, each configured to perform a different video quality enhancement operation, and to perform a quality enhancement process on a decoded video with at least one selected enhancement filter from among the quality enhancement filters and perform upscaling with the resizer. The controller selects at least one of the quality enhancement filters to be involved in the quality enhancement and sets up a processing sequence of the resizer and the at least one selected quality enhancement filter.

15 Claims, 5 Drawing Sheets

(56) References Cited

U.S. PATENT DOCUMENTS

2010/0074535 A1* 3/2010 Bennett ................ H04N 19/172
                                                    382/209
2014/0369426 A1* 12/2014 Li ......................... H04N 19/46
                                                    375/240.29

* cited by examiner

VIDEO DECODING APPARATUS AND METHOD FOR ENHANCING VIDEO QUALITY

CROSS-REFERENCE TO RELATED APPLICATION(S)

This application claims the benefit under 35 U.S.C. §119(a) of a Korean patent application filed on Sep. 25, 2012 in the Korean Intellectual Property Office and assigned Ser. No. 10-2012-0106736, the entire disclosure of which is incorporated hereby incorporated by reference.

TECHNICAL FIELD

The present disclosure relates to a video decoding apparatus and method for enhancing quality of a video having lower resolution than a display resolution of a terminal to play the video.

BACKGROUND

A terminal having a video play functionality includes a decoder to decode encoded video streams of video data received from the outside or stored in the terminal. A codec is used in video encoding and decoding. The codec compresses video data into a more compact form to save storage space or to reduce load for transmission over network. Many types of codecs are available, such as Moving Picture Experts Group (MPEG)-4, H.26x, VC1, VP8, etc. Video services over a network, such as Digital Multimedia Broadcasting (DMB), video phone services, and the like, compresses a video into a reduced screen size, i.e., low resolution for transmission. Thus, the encoded video suffers from significant video quality degradation.

Displays of portable terminals are becoming larger and larger. For video content with lower resolution than the resolution of the display of the portable terminal, the display uses a resizer to upscale the video resolution while outputting the decoded video. This causes more severe video quality degradation.

Typically, the portable terminal includes a quality enhancer for enhancing video quality. The quality enhancer is usually included in the display of the portable terminal and commonly applied for a screen in which video data and User Interface (UI) data of the portable terminal are composed. Concentrating on the image quality enhancement of the video data causes damage to the UI screen image, while concentrating on the image quality enhancement of the UI screen image barely enhances the video data screen. As such, it has thus far been difficult to mainly concentrate on the quality enhancement of the video screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a video decoding apparatus and method for enhancing video quality, by which to enhance the quality of a decoded video independently from a user interface screen in playing a video with low resolution.

Another aspect of the present disclosure is to provide a video decoding apparatus and method for enhancing video quality, by which to selectively configure any of various image quality enhancement processes and sequences for a low resolution decoded video.

The various embodiments of the present disclosure also provide a video decoding apparatus and method for enhancing video quality, by which to adaptively configure any of various image quality enhancement processes and sequences for a low resolution decoded video based on processing capability of a terminal, a user's choice, and decoded video characteristics.

In accordance with an aspect of the present disclosure, a video decoding apparatus for enhancing video quality is provided The apparatus includes a video decoder configured to decode a video stream, a quality enhancer including a resizer and quality enhancement filters configured to perform different video quality enhancement operations, and configured to perform a quality enhancement process on a decoded video with at least one selected enhancement filter from among the quality enhancement filters and to perform upscaling with the resizer, and a controller configured to select at least one of the quality enhancement filters to perform the quality enhancement process and to set up a processing sequence of the resizer and the at least one selected enhancement filter.

In accordance with another aspect of the present disclosure, a video decoding method for enhancing video quality is provided. The method includes selecting at least one quality enhancement filter to perform a quality enhancement process, each of the at least one quality enhancement filters configured to perform a different video quality enhancement, and setting up a processing sequence of a resizer and the at least one selected quality enhancement filter, and performing the quality enhancement process on a decoded video from a video stream with the at least one selected quality enhancement filter and upscaling the decoded video with the resizer.

Other aspects, advantages, and salient features of the disclosure will become apparent to those skilled in the art from the following detailed description, which, taken in conjunction with the annexed drawings, discloses various embodiments of the present disclosure

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Descriptions shall be understood as to include any and all combinations of one or more of the associated listed items when the items are described by using the conjunctive term "~ and/or ~," or the like.

The terminology used herein is for the purpose of describing particular embodiments only and is not intended to be limiting of the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

Unless otherwise defined, all terms including technical and scientific terms used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In this regard, various embodiments of the present disclosure may be applied not only to terminals dedicated to playing videos, such as e.g., Digital Versatile Disc (DVD) players and Portable Multimedia Players (PMPs) but also to any devices having video play functionality, such as desktop computers, laptop computers, tablet computers, camcorders, digital cameras, smartphones, mobile phones, etc.

Figure 1:
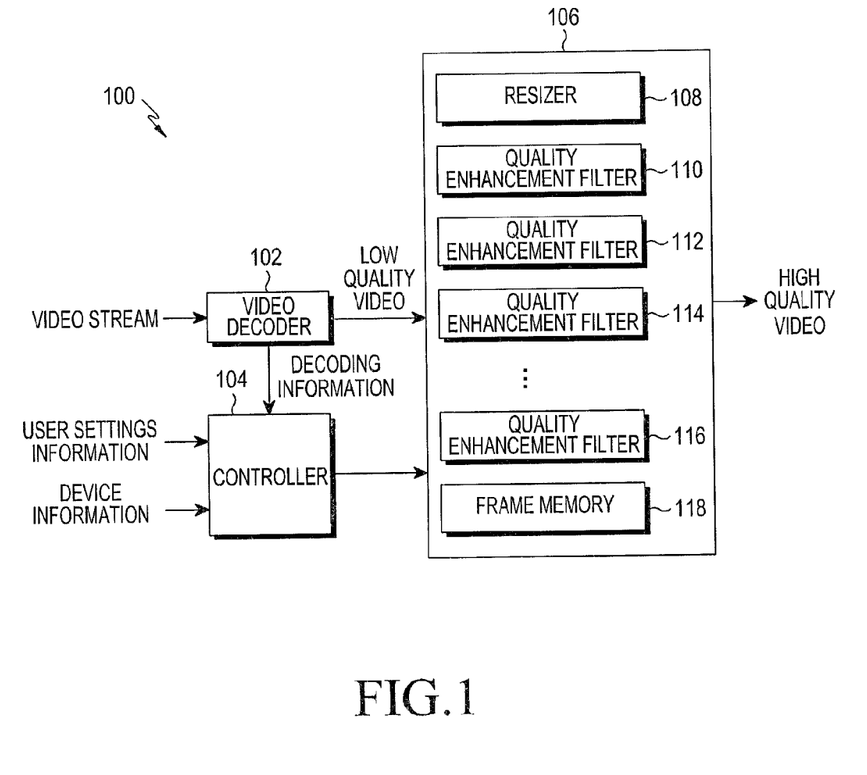
FIG. 1 is a block diagram of a video decoding apparatus, according to an embodiment of the present disclosure.

FIG. 1 is a block diagram of a video decoding apparatus, according to an embodiment of the present disclosure.

Referring to FIG. 1, a video decoding apparatus 100 includes a video decoder 102, a controller 104, and a quality enhancer 106.

The video decoder 102 decodes a video stream of video data. The controller 104 controls the quality enhancer 106 to perform a video quality enhancement process on a decoded video with low quality. A high quality video resulting from the video quality enhancement process performed by the quality enhancer 106 is provided to, and displayed by, a display of a terminal that contains the video decoding apparatus 100.

The quality enhancer 106 includes a resizer 108 and multiple quality enhancing filters 110 to 116. The resizer 108 upscales the decoded video. The quality enhancing filters 110 to 116 are different types of filters to perform different quality enhancement processes on the decoded video. Each of the quality enhancing filters 110 to 116 may be any of a saturation enhancement filter, a definition enhancement filter, an anti-aliasing filter, and a nose cancellation filter, or the like. These filters are already well known to the public, and thus no further explanation of them will be provided herein. While the quality enhancing filters 110 to 116 are assumed to be any of the saturation enhancement filter, the definition enhancement filter, the anti-aliasing filter, and the noise cancellation filter, any other types of filters that perform the quality enhancement process may be included alternatively or additionally.

The quality enhancer 106 may further include a frame memory 118. The frame memory 118 is used by one or more of the quality enhancement filters 110 to 116 as needed. For example, there may be a filter in need of the frame memory 118 to perform a quality enhancement process by referencing consecutive video frames. Examples of the filter include the nose cancellation filter. If none of the quality enhancement filters 110 to 116 needs the frame memory, the frame memory 118 may be omitted from the quality enhancer 106. Otherwise, even in the case that one of the quality enhancement filters 110 to 116 needs the frame memory, the frame memory 118 need not be used if the filter in need of the frame memory is not selected to be involved in quality enhancement.

The controller 104 selects at least one of the quality enhancement filters 110 to 116 to be involved in the quality enhancement and sets up a processing sequence of the selected quality enhancement filter and the resizer 108. The controller 104 selects one of the quality enhancement filters 110 to 116 to perform the quality enhancement process based on a video quality enhancement option and sets up a processing sequence of the selected quality enhancement filter and the resizer 108. The controller 104 may also set up filter parameters of the selected quality enhancement filter and the upscaling ratio of the resizer 108.

The video quality enhancement option may include at least one of user settings information, device information, and video characteristics information.

The user settings information includes process selection information indicating a quality enhancement process that the user selects and type selection information indicating respective types of the quality enhancement filters 110 to 116 that the user selects. The user may or may not select any of the quality enhancement filters 110 to 116 for the quality enhancement process. The user may also select at least one of the quality enhancement types of the quality enhancement filters 110 to 116 to be used in the video quality enhancement process or may not select any of them at all.

The device information may include resolution information of a display of the terminal that includes the video decoding apparatus 100, and may further include at least one of information about processing capability of the terminal and information about an amount of remaining battery power. The processing capability may be classified into high, normal, and low based on computing capability, operating speed, and the number of cores of the Central Processing Unit (CPU), and may be determined in the designing stage depending on a model of the terminal. The device information may be stored as the terminal's system information and provided to the controller 104. The information about an amount of remaining battery power indicates current battery left of the terminal.

The video characteristics information indicates characteristics of a decoded video, including at least one of resolution information and compression ratio of the video stream. The resolution information and compression ratio of the video stream may be obtained from a header of the video stream while the video decoder 102 is decoding the video stream, and is provided to the controller 104 in the decoding information.

In the video decoding apparatus 100, the video decoder 102, the controller 104, the resizer 108, and the quality enhancement filters 110 to 116 may be implemented in hardware, software, or a combination thereof. The processor or controller may be adopted as a main controller of the typical terminal, and may be implemented herein to further perform a quality enhancement process according to embodiments of the present disclosure. Alternatively, a dedicated processor or controller designed only to perform the quality enhancement process according to embodiments of the present disclosure may be used or implemented as dedicated hardware.

If the quality enhancer 106 is implemented in hardware, selection of the quality enhancement filters 110 to 116 and setup of the processing sequence of the selected quality enhancement filter and the resizer 108 may be implemented with switches controlled by the controller 104. For example, a plurality of switches for inputs of the resizer 108 and the quality enhancement filters 110 to 116 and a switch for output of the quality enhancer 106 may be used. Taking an example of the quality enhancement filter 112 in the implementation of switches for inputs, a switch used for input of the quality enhancement filter 112 may be switched to select one of the outputs of the video decoder 102, the resizer 108, and the remaining quality enhancement filters 110, 114 to 116 as an input to the quality enhancement filter 112 under control of the controller 104. Similarly, switches for inputs of the resizer 108 and the quality enhancement filters 110, 114 to 116 may also be operated in this manner. The switch for output of the quality enhancer 106 may be switched to select one of the outputs of the resizer 108 and the quality enhancement filters 110 to 116 as an output of the quality enhancer 106 under control of the controller 104. Otherwise, if the quality enhancer 106 is implemented in software except for the frame memory 118, selection over the quality enhancement filters 110 to 116 and setup of the processing sequence of the selected quality enhancement filter and the resizer 108 may be implemented in program codes that are executable by the controller 104.

Figure 2:
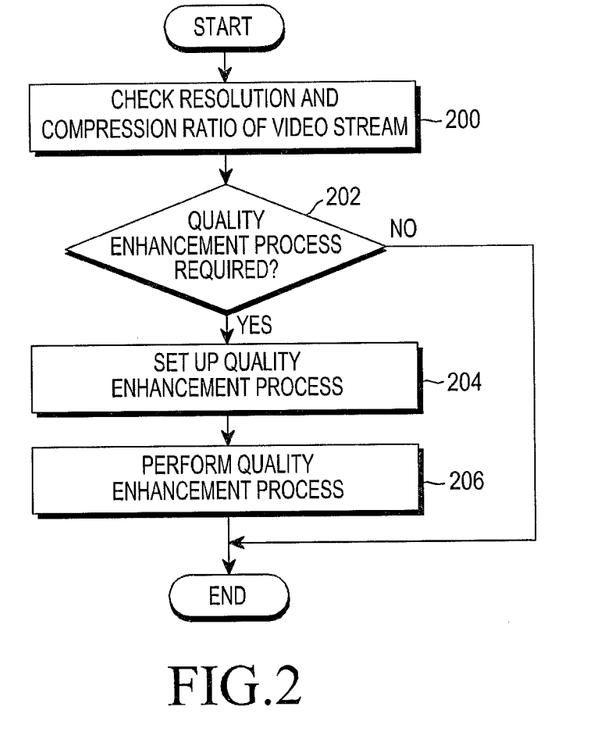
FIG. 2 is a flowchart illustrating a quality enhancement process, according to an embodiment of the present disclosure.

FIG. 2 is a flowchart illustrating a video quality enhancement process, according to an embodiment of the present disclosure.

Referring to FIG. 2, the controller 104 performs the quality enhancement process, if the process selection information indicates that the user selects a quality enhancement process. If the user does not select the quality enhancement process, the controller 104 outputs the decoded video from the decoder 102 to the display without enabling the quality enhancer 106 to perform the quality enhancement process on the decoded video.

In operation 200, the controller 104 determines resolution and compression ratio of a video stream from decoding information. In operation 202, the controller 204 determines whether a quality enhancement process by the quality enhancer 106 is required for the decoded video. Whether to perform the quality enhancement process may be determined based on either or both of the resolution and compression ratio of the video stream. If the resolution of the video stream is equal to or higher than the resolution of the display, enhancement of the quality of the decoded video may not be necessary, and thus the video enhancement process may not be performed. Even in the case that the resolution of the video stream is lower than the resolution of the display, if the compression ratio is not higher than a predetermined reference, the quality enhancement process may not be performed because video quality degradation resulting from encoding is minimal. Similarly, in the case the resolution of the video stream is equal to or higher than the resolution of the display, the quality enhancement process may be necessary if the compression ratio is higher than the predetermined reference. Accordingly, the video decoding apparatus 100 may be designed to determine whether to perform the quality enhancement process based on either or both of the resolution ratio and compression ratio of the video stream.

Even if the user selects the quality enhancement process, whether to perform the quality enhancement process may be re-determined based on the resolution and compression ratio of the video stream to prevent unnecessary quality enhancement process. In an embodiment of the present disclosure, operations 200 and 202 may be skipped. The quality enhancement process may be performed upon user request. Alternatively, the user may be prevented from selecting whether to perform the quality enhancement process, and only the operations 200 and 202 may be performed to determine whether to perform the quality enhancement process.

In operation 202, if it is determined that the quality enhancement process is not necessary, the controller 104 outputs the decoded video from the decoder 102 to the display without enabling the quality enhancer 106 to perform the quality enhancement process. Otherwise, if it is determined that the quality enhancement process is necessary, then in operation 204, the controller 104 sets up the quality enhancement process. The controller 104 selects at least one of the quality enhancement filters 110 to 116 to be involved in the quality enhancement process and sets up a processing sequence of the selected quality enhancement filter and the resizer 108. In operation 206, the controller 104 controls the quality enhancer 106 to perform the quality enhancement process on the decoded video until the end of video play.

Figure 3:
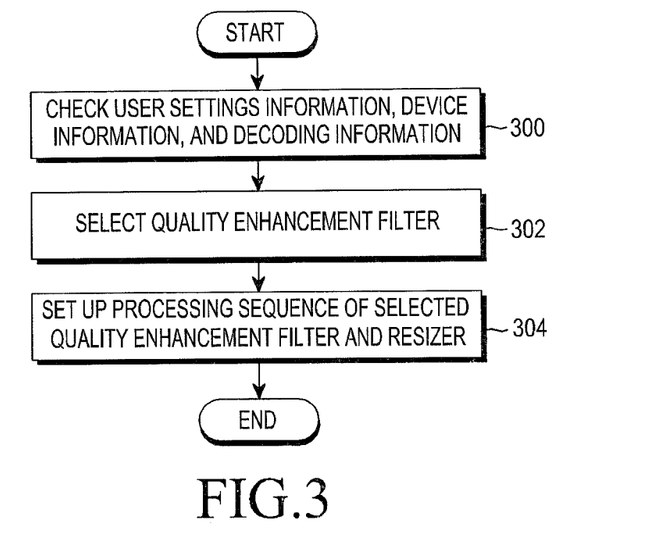
FIG. 3 is a flowchart illustrating a set-up of a quality enhancement process, according to an embodiment of the present disclosure.

FIG. 3 is a flowchart illustrating a setup of a video quality enhancement process, according to an embodiment of the present disclosure. Operations of FIG. 3 are a detailed embodiment of operation 204 of FIG. 2.

Referring to FIG. 3, in operation 300, the controller 104 analyzes quality enhancement options, e.g., user settings information, device information, and decoding information that contains video characteristic information. In operation 302, the controller 104 selects at least one of the quality enhancement filters 110 to 116 to be involved in the quality enhancement based on at least one of the user settings information, the device information, and the video characteristics information. In operation 304, the controller 104 determines a processing sequence of the selected quality enhancement filter(s) and the resizer 108.

If type selection information belonging to the user settings information indicates a quality enhancement type that the user selects, the controller 104 selects at least one quality enhancement filter to be involved in the quality enhancement based on the quality enhancement type rather than the device information or the video characteristics information, and determines the processing sequence of the selected quality enhancement filter(s) and the resizer 108. Otherwise, if the type selection information indicates that the user has not selected any quality enhancement type, the controller 104 selects at least one quality enhancement filter to be involved in the quality enhancement based on either or both of the device information or the video characteristics information, and determines the processing sequence of the selected quality enhancement filter(s) and the resizer 108.

The controller 104 sets up filter parameters of the selected type of quality enhancement filter(s) to live up to a quality enhancement level according to a quality enhancement option. In the case that the user selects to perform the quality enhancement process, the quality enhancement level may be adjusted by the user for the quality enhancement filter(s) that the user selects. Alternatively, in the case that the user does not select whether to perform the quality enhancement process, and only the operations 200 and 202 are performed to determine whether to perform the quality enhancement process, as illustrated in FIG. 2, the quality enhancement level may be adjusted based on the device information and the video characteristics information.

The quality enhancement level refers to a respective processing level of definition, saturation, noise cancellation, and anti-aliasing. Similar to typical user settings mode in the terminal, selection of whether to perform the quality enhancement process, selection of a type of quality enhancement, and adjustment of the quality enhancement level may be made using menus, icons, and the like, that are provided by an input interface of the terminal. In a case that the quality enhancement level is adjusted based on video characteristics, the quality enhancement level may be adjusted based on resolution and compression ratio of the video stream. For example, since the lower the resolution of the video stream is than the resolution of the display of the terminal or the higher the compression ratio of the video stream, the lower the video quality of a decoded video, the quality enhancement level may be set to be higher.

The controller 104 sets up an upscaling ratio of the resizer 108 according to a quality enhancement option. The upscaling ratio may be determined based on processing capability and an amount of remaining battery power of the terminal among quality enhancement options. For example, the upscaling ratio may be determined to be gradually proportional to the processing capability and/or the amount of remaining battery power.

Figure 4:
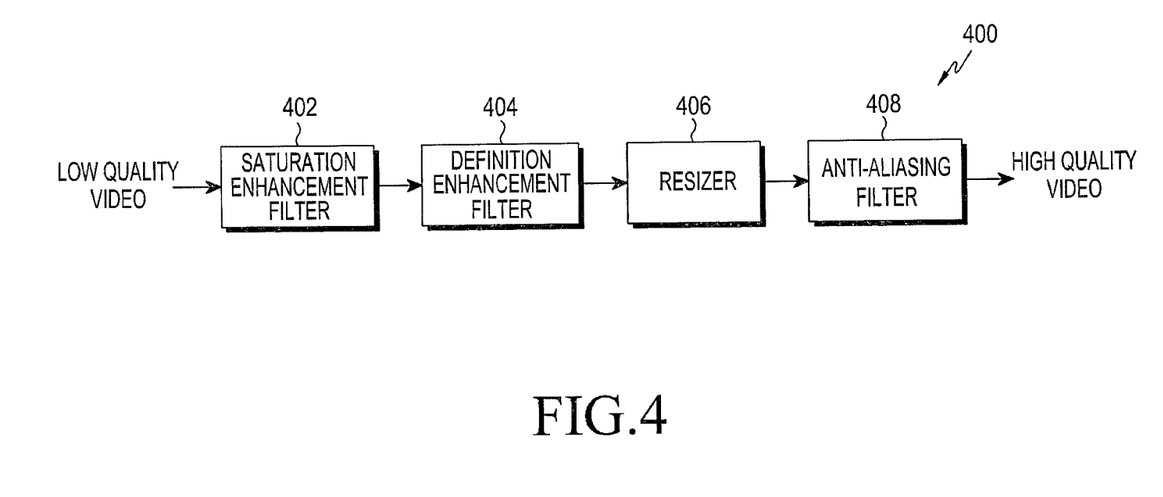
FIG. 4 is a block diagram of a quality enhancer, according to an embodiment of the present disclosure.
Figure 5:
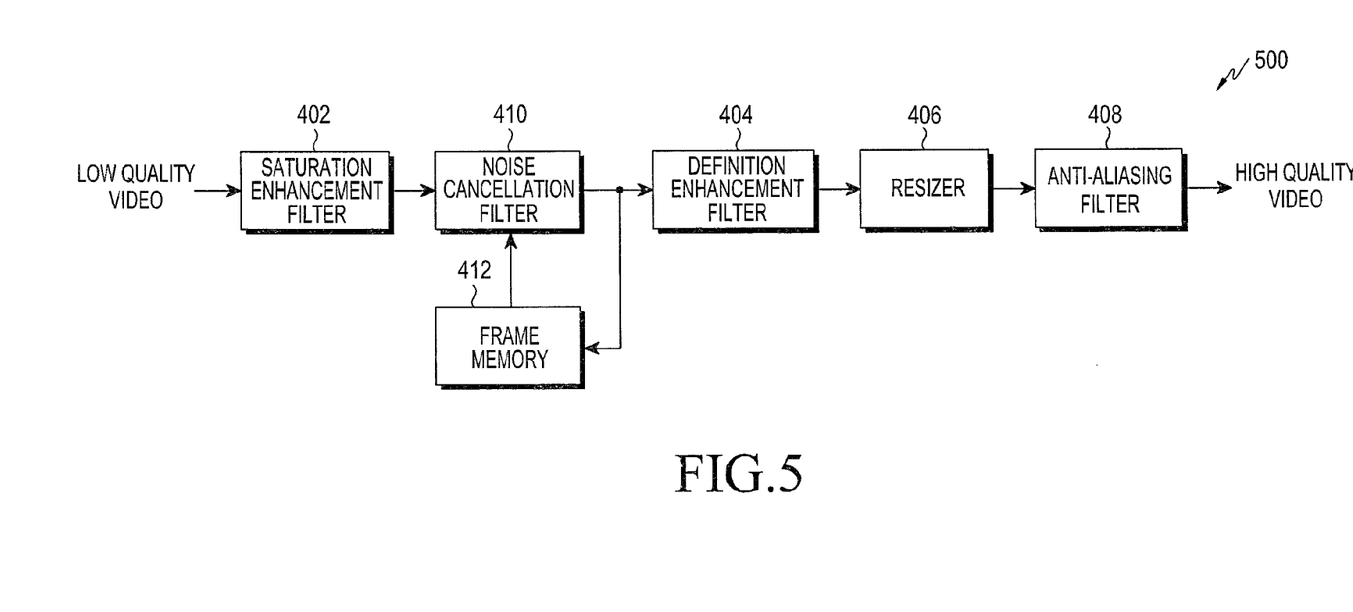
FIG. 5 is a block diagram of a quality enhancer, according to another embodiment of the present disclosure.
Figure 6:
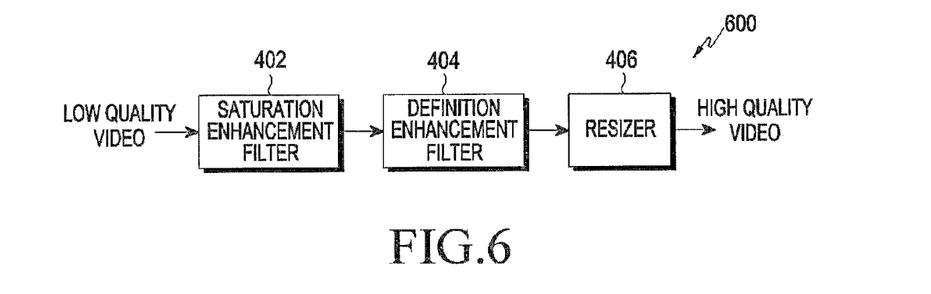
FIG. 6 is a block diagram of a quality enhancer, according to another embodiment of the present disclosure.

Accordingly, the quality enhancer 106 is configured adaptively to the quality enhancement option. The quality enhancer 106 may be configured in various forms by the controller 104 based on a quality enhancement option as various embodiments of FIGS. 4 to 6, as described below. FIGS. 4 to 6 illustrates different examples of the quality enhancer 106 configured based on three different processing capabilities, compression ratio and amounts of remaining battery power of the terminal, which are classified into high, normal, and low in case that the resolution of the video stream is lower than the resolution of the display of the terminal.

FIG. 4 is a block diagram of a quality enhancer, according to an embodiment of the present disclosure. In this embodiment, the quality enhancer 400 corresponding to the quality enhancer 106 is configured under assumption that the processing capability, amount of remaining battery power, and compression ratio of the terminal are all normal.

Referring to FIG. 4, the quality enhancer 400 includes a saturation enhancement filter 402, a definition enhancement filter 404, a resizer 406, and an anti-aliasing filter 408. The resizer 406 corresponds to the resizer 108 of FIG. 1, and the saturation enhancement filter 402, definition enhancement filter 404, and anti-aliasing filter 408 correspond to some of the quality enhancement filters 110 to 116 of FIG. 1.

An embodiment of the quality enhancer 400 where the video stream is a Digital Multimedia Broadcasting (DMB) video is described below. In this case, the video decoder 102 is an H.264 standard video decoder. An H.264 video stream with low resolution of 320*240 pixels is input to the video decoding apparatus 100 and the video decoder 102 of the video decoding apparatus 100 decodes the H.264 video stream. The decoded video is then input to the quality enhancer 400, where the saturation enhancement filter 402 and the definition enhancement filter 404 performs saturation enhancement and definition enhancement on the decoded video, thereby enhancing the color and the definition of edge parts of the decoded video. The resulting video output from the definition enhancement filter 404 is upscaled by the resizer 406. For example, the resizer 406 upscales 320*240 pixels to 640*480 pixels. Accordingly, the decoded video is upscaled to have higher resolution than the resolution of the original video stream. The anti-aliasing filter 408 enhances aliasing occurring on the edge parts of the video due to the upscaling by performing the anti-aliasing process on the upscaled video. The resulting video from the anti-aliasing filter 408 is a high quality video with 640*480 pixels.

FIG. 5 is a block diagram of a quality enhancer, according to another embodiment of the present disclosure.

Referring to FIG. 5, in this embodiment, the quality enhancer 500 corresponding to the quality enhancer 106 is configured under assumption that a video stream contains much noise due to high processing capability and high compression ratio of the terminal Of course, even in the case that the processing capability of the terminal is normal, if the compression ratio is high and thus the video stream contains significant noise, the quality enhancer 500 may be configured to have a noise cancellation filter 410, as illustrated in FIG. 5.

Referring to FIG. 5, the quality enhancer 500 includes the saturation enhancement filter 402, the definition enhancement filter 404, the resizer 406, the anti-aliasing filter 408, the noise cancellation filter 410, and a frame memory 412. The resizer 406 and the frame memory 412 corresponds to the resizer 108 and the frame memory 118 of FIG. 1, respectively. The saturation enhancement filter 402, the definition enhancement filter 404, and the anti-aliasing filter 408 correspond to some of the quality enhancement filters 110 to 116 of FIG. 1. In the quality enhancer 500, a video whose saturation has been enhanced by the saturation enhancement filter 402 goes through the noise cancellation filter 410 to remove noise before being input to the definition enhancement filter 404. The frame memory 412 is used by the noise cancellation filter 410.

FIG. 6 is a block diagram of a quality enhancer, according to another embodiment of the present disclosure.

Referring to FIG. 6, in this embodiment, the quality enhancer 600 corresponding to the quality enhancer 106 is configured under assumption that the processing capability or amount of remaining battery power of the terminal is low. The resizer 406 corresponds to the resizer 108 of FIG. 1. The saturation enhancement filter 402 and the definition enhancement filter 404 corresponds to some of the quality enhancement filters 110 to 116.

The quality enhancer 600 includes the saturation enhancement filter 402, the definition enhancement filter 404, and the resizer 406. Compared with FIG. 4, the quality enhancer 600 of FIG. 6 does not include the anti-aliasing filter 408. In a case where the processing capability or the amount of the remaining battery power of the terminal is low, the quality enhancement process is only involved with enhancement of saturation, definition, and up-scaling without need for any complicated filter, such as the anti-aliasing filter 408.

Figure 7A:
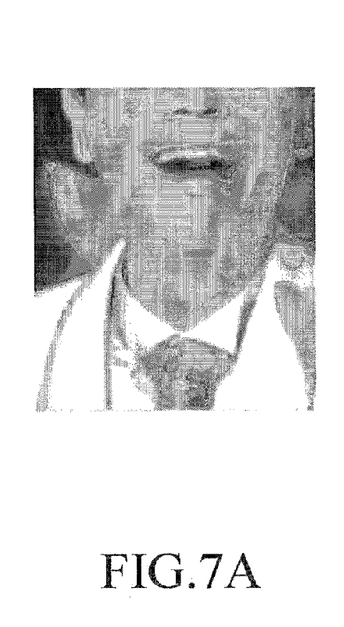
FIGS. 7A and 7B illustrate screen images before and after a quality enhancement process, according to an embodiment of the present disclosure.
Figure 7B:
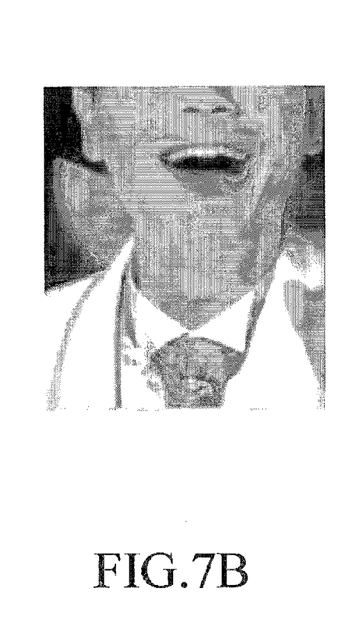

FIGS. 7A and 7B illustrate screen images before and after a video enhancement process, according to an embodiment of the present disclosure, FIG. 7A illustrates a screen image before the video enhancement process, and the FIG. 7B illustrates a screen image after the video enhancement process.

Referring to FIGS. 7A and 7B, compared with FIG. 7A, the screen image of FIG. 7B appears much superior to that of FIG. 7A in terms of saturation, definition, and edge sharpness of the image.

While three configurations of the quality enhancer 106 are illustrated in FIGS. 4 to 6, there may be other different types of configurations of the quality enhancer 106 in other various embodiments.

In a terminal having a large-sized screen, a video quality enhancement process is performed on a video decoded by a decoding apparatus independently from the display of the terminal, and thus the video quality of the decoded video may be enhanced independently of the User Interface screen. For a decoded video with low video quality, various types of quality enhancement processes and sequences may be configured selectively or adaptively based on the processing capability of the terminal, the user's choice, or characteristics of the decoded video. Therefore, optimum video quality enhancement may be achieved with various conditions related to video play being taken into account.

Various embodiments have thus been described, but it will be understood that various modifications can be made without departing the scope of the present disclosure. In this regard, while the resizer 406 is placed after the saturation enhancement filter 402 and the definition enhancement filter 404 in FIGS. 4 to 6, the placement of the resizer 406 may vary in other embodiments. For example, the resizer 406 may be placed at the head of the quality enhancer 106. In this case, a decoded video is upscaled first and then is subject to processes of saturation enhancement, definition enhancement, and the like, leading to a significant effect of video quality enhancement but also causing a significant amount of computation. If the anti-aliasing filter 408 is used with the resizer 406, the anti-aliasing filter 408 has to be placed after the resizer 406.

In a case where a decoded video has the same resolution as the resolution of the display but a quality enhancement process is required, upscaling is not necessary and thus the resizer 406 may be eliminated in the various embodiments of FIGS. 4 to 6.

The above-described methods according to the various embodiments of the present disclosure can be implemented in hardware, firmware or as software or computer code that is stored on a non-transitory machine readable medium such as a Compact Disc Read Only Memory (CD ROM), a Random Access Memory (RAM), a floppy disk, a hard disk, or a magneto-optical disk or computer code downloaded over a network originally stored on a remote recording medium or a non-transitory machine readable medium and stored on a local non-transitory recording medium, so that the methods described herein are loaded into hardware such as a general purpose computer, or a special processor or in programmable or dedicated hardware, such as an Application Specific Integrated Circuit (ASIC) or Field-Programmable Gate Array (FPGA). The various embodiments of the present disclosure may be implemented by a program having codes for embodying the apparatus and method described in claims, the program being stored in a non-transitory machine (or computer) readable storage medium.

The video decoding method for enhancing video quality according to the various embodiments of the present disclosure may be downloaded from a remote program providing apparatus, e.g., a server, in the form of the program, and the program is installed in a mobile device to be used in video decoding. The program installed in the mobile device is carried out by the mobile device to provide the video decoding functionality. The program providing apparatus sends the program to the mobile device automatically or on request. The program providing apparatus may further determine whether the mobile device signs up for the service, confirm authentication of the user and payment information and so on. The program providing apparatus may include a communication unit for communicating with the mobile device wirelessly or via a cable, a storage medium for storing the program, and a controller for controlling the communication unit to send the program to the mobile device. The storage medium may be inside or outside of the program providing apparatus.

While the present disclosure has been shown and described with reference to various embodiments thereof, it will be understood by those skilled in the art that various changes in form and details may be made therein without departing the spirit and scope of the present disclosure as defined by the appended claims and their equivalents.

What is claimed is:

1. A video decoding apparatus for enhancing video quality, the apparatus comprising:
   a video decoder configured to decode a video stream;
   a quality enhancer including a resizer and different types of quality enhancement filters, the quality enhancer being configured to:
      perform a quality enhancement process on a decoded video of the video stream with at least one selected quality enhancement filter selected from among the different types of quality enhancement filters, and
      perform upscaling via the resizer; and
   a controller configured to:

select the at least one of the different types of quality enhancement filters to perform the quality enhancement process, according to a first quality enhancement option, and set up a processing sequence of arranging the resizer and the at least one selected quality enhancement filter, in a first order according to the first quality enhancement option, wherein the quality enhancer is further configured to perform the upscaling and the quality enhancement process, in the processing sequence, and wherein the controller is further configured to:
set up a position of the resizer before or after the at least one selected quality enhancement filter within the processing sequence based on the first quality enhancement option, and determine whether an anti-aliasing filter placed after the resizer is included within the processing sequence based on the first quality enhancement option.

2. The video decoding apparatus of claim 1,
wherein the first quality enhancement option includes at least one of user settings information, device information, and video characteristics information.

3. The video decoding apparatus of claim 2, wherein the controller is further configured to set up parameters of the at least one selected quality enhancement filter and unsealing ratio, according to the first quality enhancement option.

4. The video decoding apparatus of claim 2,
wherein the user settings information comprises process selection information indicating whether a user selects the quality enhancement process, and type selection information indicating types of the quality enhancement filters that the user selects, wherein the device information comprises information about resolution of a display, and at least one of processing capability information and an amount of remaining battery power of a device that includes the video decoding apparatus, and wherein the video characteristics information comprises at least one of resolution of the video stream and compression ratio information.

5. The video decoding apparatus of claim 3,
wherein the user settings information comprises process selection information indicating whether a user selects the quality enhancement process, and type selection information indicating types of the quality enhancement filters that the user selects, wherein the device information comprises information about resolution of a display, and at least one of processing capability information and an amount of remaining battery power of a device that includes the video decoding apparatus, and wherein the video characteristics information comprises at least one of resolution of the video stream and compression ratio information.

6. The video decoding apparatus of claim 1, wherein the different types of quality enhancement filters comprise at least one of a saturation enhancement filter, a definition enhancement filter, and a noise cancellation filter.

7. The video decoding apparatus of claim 1, wherein the quality enhancer further comprises a frame memory which is used by any of the different types of quality enhancement filters in need of the frame memory.

8. The video decoding apparatus of claim 1, wherein the controller determines whether to perform the quality enhancement process on the decoded video based on at least one of a resolution and a compression ratio of the video stream.

9. A video decoding method for enhancing video quality, the method comprising:
selecting at least one quality enhancement filter from among different types of quality enhancement filters, according to a first quality enhancement option;

setting up a processing sequence of arranging a resizer and the at least one selected quality enhancement filter, in a first order according to the first quality enhancement option; and performing a quality enhancement process on a decoded video from a video stream with the at least one selected quality enhancement filter and upscaling the decoded video with the resizer, in the processing sequence, wherein the setting up of the processing sequence comprises:
setting up a position of the resizer before or after the at least one selected quality enhancement filter within the processing sequence based on the first quality enhancement option, and determining whether an anti-aliasing filter placed after the resizer is included within the processing sequence based on the first quality enhancement option.

10. The video decoding method of claim 9,
wherein the first quality enhancement option includes at least one of user settings information, device information, and video characteristics information.

11. The video decoding method of claim 10, wherein the setting up comprises:
setting up parameters of the at least one selected quality enhancement filter and upscaling ratio, according to the first quality enhancement option.

12. The video decoding method of claim 10,
wherein the user settings information comprises process selection information indicating whether a user selects the quality enhancement process, and type selection information indicating types of the quality enhancement filters that the user selects, wherein the device information comprises information about a resolution of a display, and at least one of processing capability information and an amount of remaining battery power of a device that includes the video decoding apparatus, and wherein the video characteristics information comprises at least one of resolution of the video stream and compression ratio information.

13. The video decoding method of claim 11,
wherein the user settings information comprises process selection information indicating whether a user selects the quality enhancement process, and type selection information indicating types of the quality enhancement filters that the user selects, wherein the device information comprises information about a resolution of a display, and at least one of processing capability information and an amount of remaining battery power of a device that includes the video decoding apparatus, and wherein the video characteristics information comprises at least one of a resolution of the video stream and compression ratio information.

14. The video decoding method of claim 9, wherein the different types of quality enhancement filters comprises at least one of a saturation enhancement filter, a definition enhancement filter, and a noise cancellation filter.

15. The video decoding method of claim 9, further comprising:
    prior to selecting the at least one quality enhancement filter, determining whether to perform the quality enhancement process on the decoded video based on resolution and compression ratio of the video stream.

\* \* \* \* \*